US011933503B2

(12) United States Patent
 Markert et al.

(10) Patent No.: US 11,933,503 B2
(45) Date of Patent: Mar. 19, 2024

(54) SYSTEM AND METHOD FOR PROVIDING CONDITIONED AIR AT A LOADING DOCK

(71) Applicant: DL Manufacturing Inc., North Syracuse, NY (US)

(72) Inventors: Joseph Markert, East Syracuse, NY (US); Donald L Metz, Kirkville, NY (US); Kyle J. Berean, Chittenango, NY (US); Gregory J. Duffy, Baldwinsville, NY (US); Kristian P. Garrow, Cortland, NY (US)

(73) Assignee: DL Manufacturing Inc, North Syracuse, NY (US)

( * ) Notice: Subject to any disclaimer, the term of this patent is extended or adjusted under 35 U.S.C. 154(b) by 136 days.

(21) Appl. No.: 17/724,458

(22) Filed: Apr. 19, 2022

(65) Prior Publication Data
 US 2022/0333789 A1 Oct. 20, 2022

Related U.S. Application Data

(60) Provisional application No. 63/176,377, filed on Apr. 19, 2021.

(51) Int. Cl.
 *F24F 1/0011* (2019.01)
 *B60H 1/00* (2006.01)
 *F24F 1/0022* (2019.01)
 *F24F 5/00* (2006.01)
 *F24F 11/76* (2018.01)

(52) U.S. Cl.
 CPC ........ *F24F 1/0011* (2013.01); *B60H 1/00014* (2013.01); *F24F 1/0022* (2013.01); *F24F 5/001* (2013.01); *F24F 11/76* (2018.01)

(58) Field of Classification Search
 CPC . F24F 1/00075; F24F 1/0011; B60H 1/00821; B60H 1/00014; B60H 1/00364
 See application file for complete search history.

(56) References Cited

U.S. PATENT DOCUMENTS

2014/0360221 A1* 12/2014 Kyle .................. B63J 2/04
 62/426
2017/0343222 A1* 11/2017 Markert ............ F24F 1/0011

* cited by examiner

*Primary Examiner* — Lionel Nouketcha
(74) *Attorney, Agent, or Firm* — Barry F. Manna

(57) ABSTRACT

A facility-based dual-purpose conditioned air blower system includes a heat exchange unit, a diverter apparatus, and a centrifugal blower. The heat exchange unit includes an ambient air inlet, heat exchange elements, and a conditioned air outlet. The diverter apparatus includes a diverter inlet fluidly coupled to the conditioned air outlet of the heat exchange unit, a first diverter outlet to the facility, and a second diverter outlet. The diverter apparatus is moveable between a first position wherein the first diverter outlet is closed and the second diverter outlet is open, and a second position wherein the first diverter outlet is open and the second diverter outlet is closed. The centrifugal blower includes a blower inlet fluidly coupled to the second diverter outlet of the diverter apparatus, and a blower outlet positioned to ventilate a trailer interior with conditioned air from the conditioned air outlet of the heat exchange unit.

20 Claims, 12 Drawing Sheets

SYSTEM AND METHOD FOR PROVIDING CONDITIONED AIR AT A LOADING DOCK

Reference is made to and this application claims priority from and the benefit of U.S. Provisional Application Ser. No. 63/176,377, filed Apr. 19, 2021, entitled "SYSTEM AND METHOD FOR PROVIDING CONDITIONED MR AT A LOADING DOCK", which application is incorporated herein in its entirety by reference.

BACKGROUND OF THE INVENTION

This disclosure relates generally to a conditioned air blower system and, more specifically, to a centrifugal blower having temperature-conditioned air provided at the blower inlet.

A noted problem within the loading dock industry concerns ventilation inside a trailer when workers load and unload the contents of the trailer. Standard loading dock fans provide high volume airflow, but since the airflow is at a low velocity, and randomly directed, the airflow does not travel much more than half the trailer length before it recirculates back into the fan's intake. As a result, the air in the back of the trailer (e.g., towards the cab) becomes stagnant and hot. One recent improvement to the standard loading dock fan is a laminar flow centrifugal blower having a necked-down discharge tube with an elbow that allows the discharge air to be directed into the trailer. The combination of laminar flow and the gradual decrease in diameter of the discharge tube provides a high velocity discharge stream that is able to efficiently ventilate the entire interior of the trailer. exuviate Although a laminar flow centrifugal blower can be useful and may be advantageous for certain applications, it does suffer from drawbacks. One drawback is that the high velocity discharge air stream is the same ambient temperature as the loading dock bay area, which may be much warmer or cooler than the rest of the facility. In some loading dock bay areas, the overhead doors are left in the open position to accommodate frequent trailer traffic at the docks. In such cases, a flexible PVC strip curtain may be installed to separate the loading bay area from the remainder of the shop floor. In time, then, the temperature of the loading bay area approaches the outdoor temperature. In other loading dock applications, the doors may be closed more frequently but the bay area may have insufficient HVAC service to keep the temperature and humidity of the bay area at a comfortable level. Thus, if the loading dock bay area is uncomfortably warm, or uncomfortably cold, the ventilation air in the trailer will be the same uncomfortable temperature.

BRIEF SUMMARY OF THE INVENTION

In one aspect of the invention, a facility-based dual-purpose conditioned air blower system includes a heat exchange unit, a diverter apparatus, and a centrifugal blower. The heat exchange unit includes an ambient air inlet, heat exchange elements, and a conditioned air outlet. The diverter apparatus includes a diverter inlet fluidly coupled to the conditioned air outlet of the heat exchange unit; a first diverter outlet to the facility; and a second diverter outlet. The diverter apparatus is moveable between a first position wherein the first diverter outlet is closed and the second diverter outlet is open, and a second position wherein the first diverter outlet is open and the second diverter outlet is closed. The centrifugal blower includes a blower inlet fluidly coupled to the second diverter outlet of the diverter apparatus, and a blower outlet positioned to ventilate a trailer interior with conditioned air from the conditioned air outlet of the heat exchange unit.

In one example, the heat exchange unit comprises a chiller system.

In another example, the first diverter outlet includes a first damper with shutters.

In another example, the dual-purpose conditioned air blower system further includes a controller operatively associated with the diverter apparatus and the centrifugal blower, the controller programmed to, responsive to the presence of the trailer, energize the centrifugal blower and command the diverter apparatus to the first position.

The controller may be programmed to, responsive to the absence of a trailer, de-energize the centrifugal blower and command the diverter apparatus to the second position.

In another aspect of the invention, a method for providing conditioned air at a loading dock is provided, including the steps of supplying a heat exchange unit having an ambient air inlet, heat exchange elements, and a conditioned air outlet; supplying a diverter apparatus having a diverter inlet fluidly coupled to the conditioned air outlet of the heat exchange unit, a first diverter outlet, and a second diverter outlet; supplying a centrifugal blower having a blower inlet fluidly coupled to the second diverter outlet of the diverter apparatus; positioning the centrifugal blower to ventilate a trailer interior with conditioned air from the conditioned air outlet of the heat exchange unit; determining the presence of a trailer at the loading dock; and if a trailer is present, moving the diverter apparatus to a first position wherein the first diverter outlet is closed and the second diverter outlet is open; and if a trailer is not present, moving the diverter apparatus to a second position wherein the first diverter outlet is open and the second diverter outlet is closed.

BRIEF DESCRIPTION OF THE SEVERAL VIEWS OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views. For example, differing embodiments of like elements may be assigned 100-series, 200-series, and so on.

DETAILED DESCRIPTION OF THE INVENTION

As used herein, the term "trailer" means a vehicle with an enclosed cargo area, and may include, but is not limited to, tractor trailer trucks, refrigerated trucks, box trucks, delivery trucks, and vans.

Figure 1:
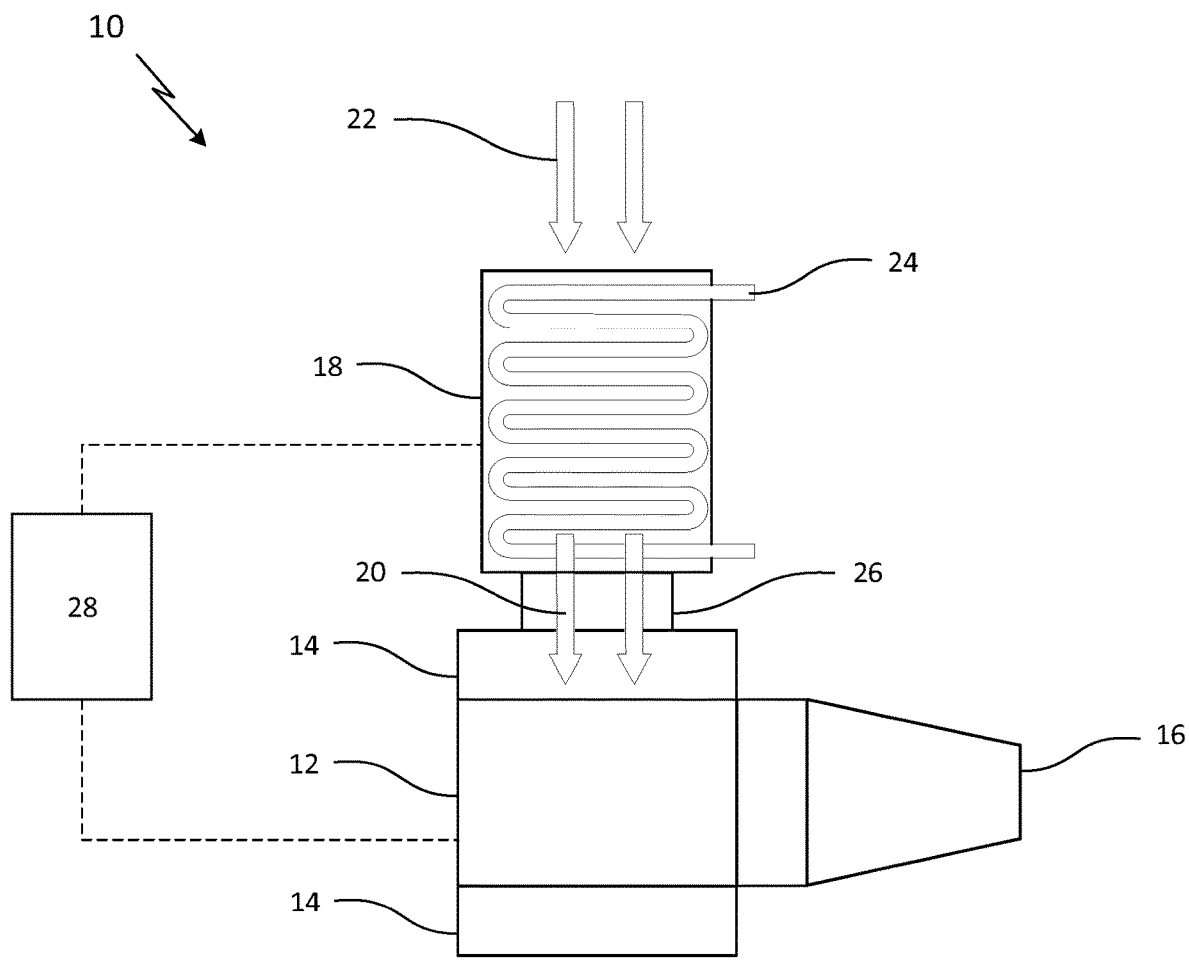
FIG. 1 depicts a block schematic diagram of a conditioned air blower system in accordance with one embodiment of the invention.

FIG. 1 illustrates a schematic diagram of an exemplary embodiment of a conditioned air blower system 10 that may be used to provide a more comfortable flow of air to a trailer interior. The conditioned air blower system 10 includes a centrifugal blower 12 having at least one inlet portion 14 to direct air into the blower, and a discharge portion 16 to direct air from the blower 12 into the trailer interior. The conditioned air blower system 10 further includes a heat exchange unit 18 to supply temperature-conditioned air 20 to the inlet portion 14 of the centrifugal blower 12. The term 'temperature-conditioned air' means air that has been heated or cooled relative to the temperature of the ambient air 22 in the loading dock area, including air that has had its moisture content adjusted relative to that surrounding the loading dock area. The heat exchange unit 18 includes heat exchange elements 24 to condition a supply of ambient air 22 by raising or lowering the temperature of the air. In some embodiments, the conditioned air blower system 10 includes a supply duct 26 connecting the output of the heat exchange unit 18 with the inlet portion 14 of the blower 12.

The conditioned air blower system 10 may further include a controller 28 operatively associated with the centrifugal blower 12 and the heat exchange unit 18. The controller can be configured to monitor an input condition or sensor related to the centrifugal blower 12 and, in response to the condition, regulate the supply of temperature-conditioned air 20 to the blower 12.

Figure 2:
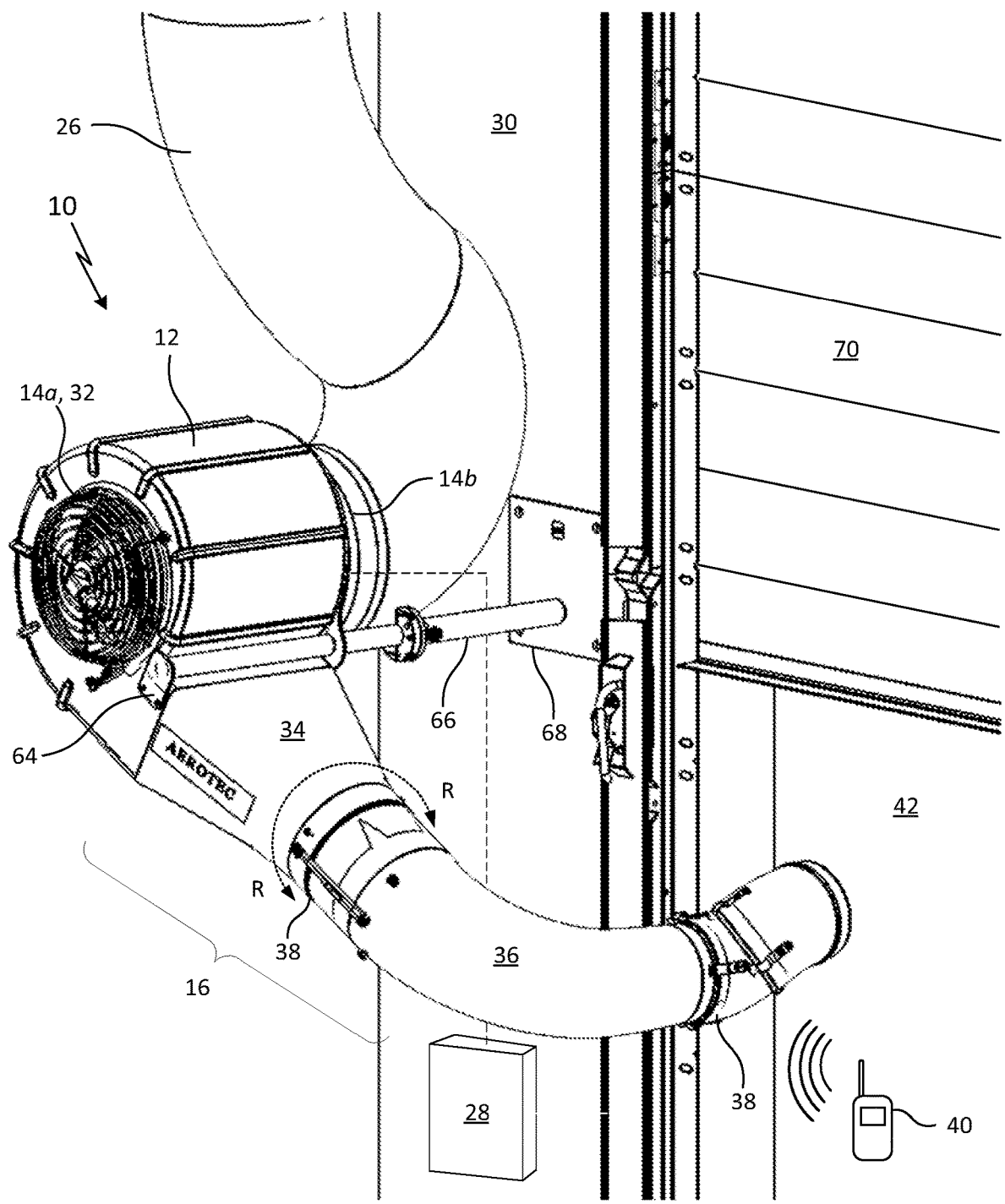
FIG. 2 depicts a perspective view of a conditioned air blower system in accordance with the embodiment shown in FIG. 1.

FIG. 2 illustrates a portion of a conditioned air blower system 10 in accordance with one embodiment of the invention. The centrifugal blower 12 includes two inlet portions which, as defined herein, generally refers to the hardware required to direct air into the blower 12. The particular configuration of centrifugal blower 12 depicted in FIG. 2 draws air in from both sides of the blower 12. Thus, the centrifugal blower 12 includes a first inlet portion 14a that interfaces with a supply duct 26 from a heat exchange unit 18 (not shown), and a second inlet portion 14b that draws in ambient air from the loading dock bay area. As shown, the centrifugal blower 12 may be mounted a distance away from the loading dock inside wall 30 to provide sufficient clearance for the supply duct 26 to be mounted behind the blower.

As noted, the centrifugal blower 12 may have two inlet portions 14a, 14b on opposing sides of the blower housing. In the illustrated embodiment, the supply duct 26 with temperature-conditioned air 20 is mounted to inlet portion 14b. In some environments it may be desirable to partially block or completely block the opposing inlet portion (e.g., 14a) to maximize the temperature-conditioned air 20 entering the trailer. In some embodiments, then, a damper system 32 may be utilized to regulate the amount or degree or percentage of ambient air supplied to the centrifugal blower 12. The damper system 32 (not illustrated) may be positioned within the inlet portion 14a of the centrifugal blower 12. In one example, the damper system 32 may be a circular plate that can be manually rotated to block all or a portion of the ambient air entering inlet portion 14a.

The blower 12 may further include a discharge portion 16 configured to direct air from the blower into the trailer interior 42. The blower 12 may be mounted above and/or to the side of the overhead door frame to minimize obstruction with the trailer interior 42 and decrease the likelihood of being hit by a forklift. The discharge portion 16 may include a straight discharge adapter 34 configured to transition the discharge from a rectangular cross section to a smaller circular cross section, and may further include an elbow conduit 36 to turn the air flow and direct it into the trailer interior 42. The exit of the elbow conduit 36 may be a smaller diameter than the entrance to further backpressure the centrifugal blower 12 for better performance. The discharge portion 16 and/or the elbow conduit 36 may further include a break-away pivoting portion 38 that permits the elbow to rotate about its central axis (indicated by arrows R-R), enabling a range of airflow adjustment into the trailer and also enabling the elbow conduit 36 to pivot completely out of the overhead door opening when not in use. The break-away pivoting portion 38 may also include a break-away feature that allows the elbow conduit 36 to snap free from the discharge adapter 34 in the event a forklift hits the elbow. The break-away feature may also permit easy re-installation.

In operation, the controller 28 may be operatively associated with the centrifugal blower 12 and the heat exchange unit 18 (FIG. 1). The controller may be configured to monitor a condition related to the centrifugal blower 12 and regulate the supply of temperature-conditioned air 20 in response to the condition. The controller 28 may also operate the damper system 32 (e.g., activate and position the damper). In one example, the controller 28 could monitor an environmental condition such as the temperature inside the trailer. A wireless temperature sensor 40 may be placed in the trailer interior 42 at the front trailer wall. The output data of the temperature sensor 40 may be evaluated by a processor within the controller 28. In one example, the temperature data may be compared to a threshold limit value stored in a lookup table. Based upon the reading, the controller 28 may execute instructions, such as powering on the blower 12 and the heat exchange unit 18 if the temperature reading is greater than the threshold value (e.g., 80° F.). In a similar manner, the controller 28 may power off the blower 12 and heat exchange unit 18 if the temperature reading subsequently drops below the threshold value.

In another example, the temperature sensor 40 may be located in the discharge portion 16 of the centrifugal blower 12. The controller 28 may be configured to regulate a parameter associated with the centrifugal blower 12, such as air discharge temperature or air flow. For example, the air discharge temperature data may be compared to a desired range of values stored in a lookup table. Based upon the temperature data, the controller 28 may execute instructions to power on the heat exchange unit 18 and increase or decrease the speed of the blower 12 to maintain the air discharge temperature within the desired range.

In another embodiment of the invention, the controller may be configured to monitor a simple on-off switch. The conditioned air blower system 10 may be controlled by a switch that is in a 'normally off' position. In the event a user desires temperature-conditioned air 20 into the trailer, the user may manually select the 'on' position of the switch. In response, the controller 28 may turn on power to the centrifugal blower 12.

In another example of its operation, the centrifugal blower 12 may be activated without use of a controller. For example, the centrifugal blower 12 may be manually powered on using a simple on-off switch, or by plugging its power cord to a standard 120 volts a/c (VAC) outlet. The damper system 32, if present, may also be manually operated without a controller.

In another embodiment of the invention, the controller 28 may be configured to monitor an operating condition of the centrifugal blower 12. In one example, the controller 28 may monitor a current sensor coupled to a power cord on the motor of the centrifugal blower 12. The current sensor may give an indication of the power level at which the centrifugal blower 12 is operating. The controller 28 may command more or less power to the centrifugal blower 12 in response to, for example, a temperature sensor positioned in or near the discharge portion 16 of the blower, or within the trailer interior 42. In another example, the controller 28 may monitor a shaft speed sensor coupled to the motor of the blower.

The output data from the temperature sensor 40 may also be utilized as input for a feedback control loop to position the damper plate 32. For example, the damper could be closed down to minimize airflow through inlet portion 14a of the centrifugal blower 12, thereby maximizing the cooling capability of the conditioned air blower system 10. A low amperage servo motor could operate the damper system 32 in response to commands from the controller 28.

Figure 3:
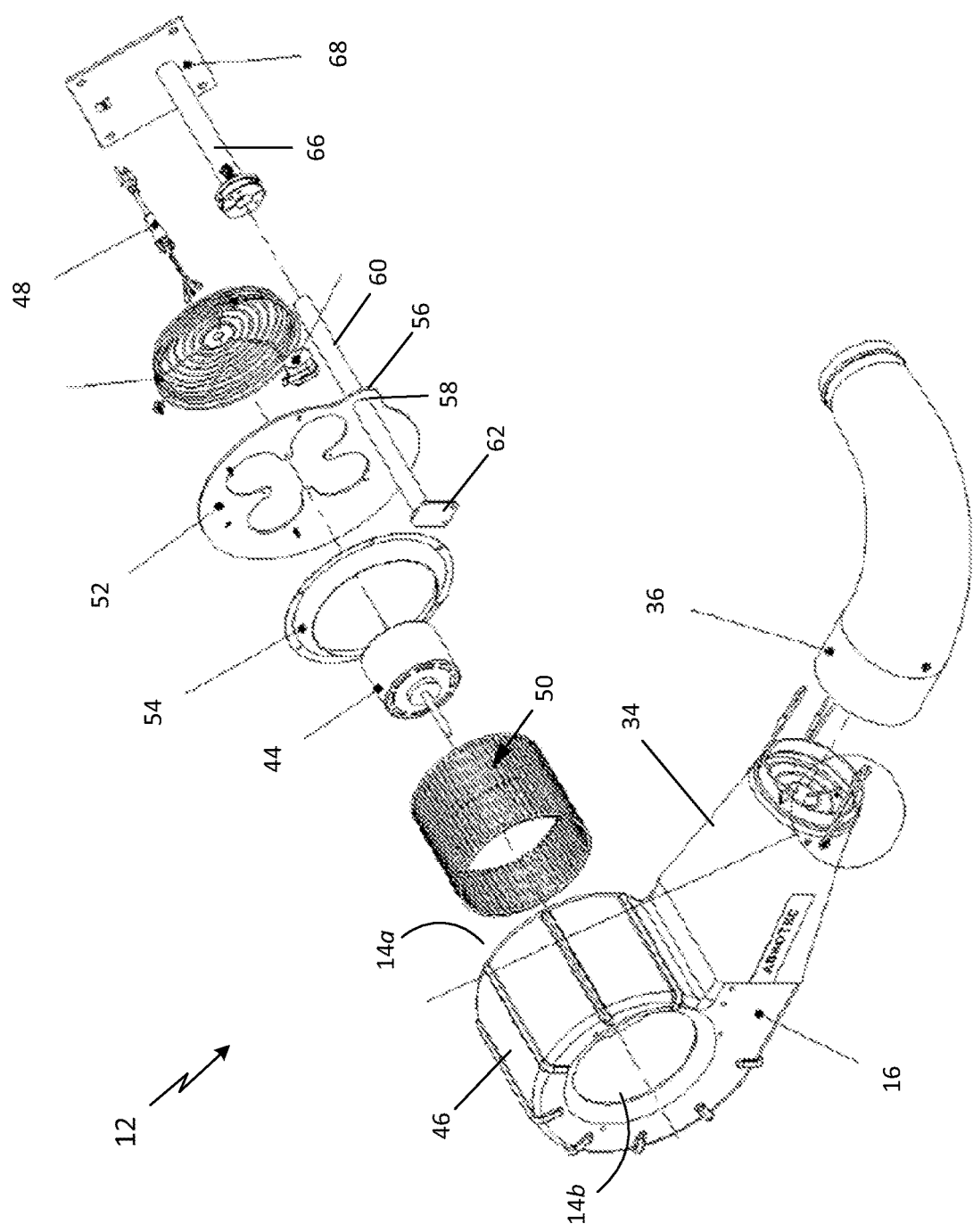
FIG. 3 depicts an exploded perspective view of the centrifugal blower shown in FIG. 2.

The centrifugal blower 12, shown in greater detail in FIG. 3, may include an internal motor 44 secured within a blower housing 46. The motor 44 may be powered by a 120 VAC supply, provided through a power cord 48. The driveshaft of the motor 44 turns a blower fan 50, known within the industry as a squirrel cage. In operation, air is drawn in from the sides of the blower housing 46, or inlet portions 14a, 14b, is then turned 90 degrees, accelerates due to the centrifugal force as it flows over the fan blades 50, and then exits the blower housing 46. The discharge air is further accelerated as it passes through the necked-down discharge adapter 34, then accelerated further as it passes through the necked-down elbow conduit 36. Upon discharge, the air has sufficient velocity to flow down the length of the trailer, bounce off the front trailer wall, and circulate back through the middle and opposite side of the trailer, thereby creating a ventilated environment.

The centrifugal blower 12 may further include a mounting assembly to properly position the blower over the door frame of the loading dock. In one embodiment, the mounting assembly includes a bracket plate 52 fastened to an air inlet ring 54, which is in turn fastened to the blower housing 46. The bracket plate 52 includes a protrusion 56 or 'ear' along its periphery. The protrusion 56 defines an aperture 58 configured to accommodate a mounting bar 60 in sliding engagement. A first end of the mounting bar 60 includes a blower housing mounting plate 62 which is secured to the centrifugal blower housing 46 adjacent the outlet opening thereof by means of screws or rivets 64 (FIG. 2). The opposite end of the mounting bar 60 telescopically engages a larger-diameter mounting tube 66. The end of the mounting tube 66 opposite the telescoping engagement includes a mounting plate 68, which may be secured to the wall 30 of the loading dock, adjacent an overhead door, by any suitable means such as screws (FIG. 2). As can be appreciated with reference to FIG. 2, the mounting hardware allows the blower 12 to extend towards and away from the wall 30, which may be beneficial in accommodating the connection to the supply duct 26, or an externally mounted motor.

In another embodiment of the invention, the centrifugal blower 12 may have only one inlet portion 14. For example, referring to FIG. 2, the inlet portion 14b may be replaced by an externally mounted motor, such that no air enters from that side of the blower 12. Or, in another example, there is no inlet on that side of the blower 12. In such an arrangement, the sole inlet portion 14 would receive the temperature-conditioned air 20 from the heat exchange unit 18. In one example, the supply duct 26 could be configured to separate from the inlet portion 14 by latches or the like when the temperature-conditioned air 20 is not needed.

The heat exchange unit 18 may be selected from any suitable configuration that fits the space, availability, and requirements. For example, the heat exchange unit 18 may be part of a non-ducted air conditioning system, such as the evaporative heat exchanger in a residential split or mini-split system. Split and mini-split systems have an outdoor compressor/condenser, and an indoor evaporator or air-handling unit. A conduit, which houses the power cable, refrigerant tubing 24, suction tubing, and a condensate drain, links the outdoor and indoor units. The temperature-conditioned air 20 output from the air handling unit may be routed to the inlet portion 14 of the centrifugal blower 12.

In another example, the heat exchange unit 18 may be part of a ducted HVAC system, such as direct expansion (DX) or chilled water system in a central plant. A ducted system may also include a packaged system, such as floor standing air cooled or water cooled air conditioner, or an air cooled ductable split system. In the ducted systems, a portion of the temperature-conditioned air 20 from the air handling unit can be routed to the inlet portion 14 of the centrifugal blower 12.

Figure 4:
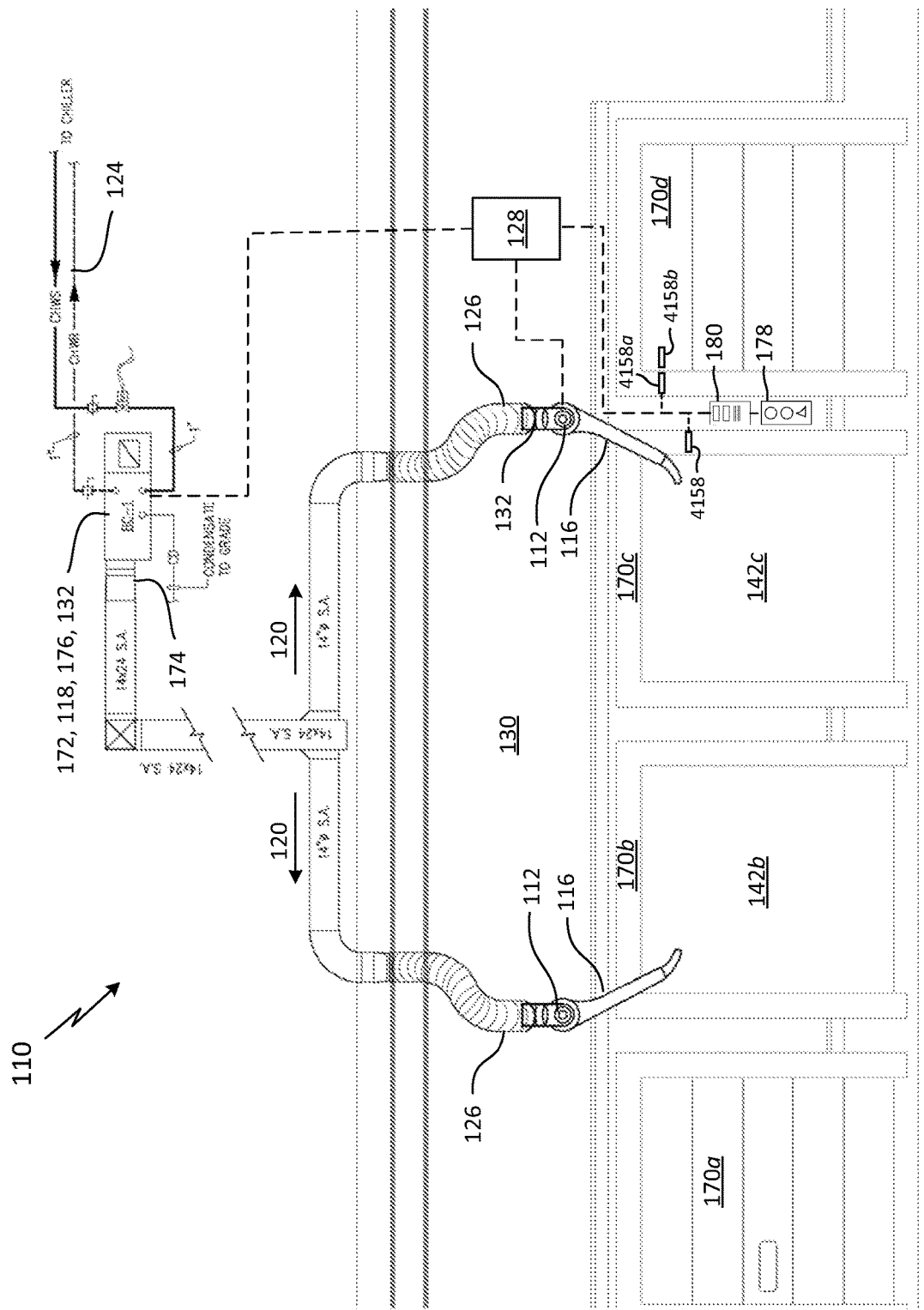
FIG. 4 depicts a plan view of a conditioned air blower system with a block schematic diagram in accordance with a second embodiment of the invention.

Turning now to FIG. 4, wherein like numerals are used to indicate like parts from FIGS. 1-3, shown is another embodiment of a conditioned air blower system 110 along with a schematic diagram of a heat exchange unit 118 that provides temperature-conditioned air 120 to multiple blowers 112. The conditioned air blower system 110 is illustrated as seen from inside a loading dock bay area, looking out through the overhead doors 170. Doors 170a and 170d are closed, and doors 170b and 170c are open. Truck trailers may be backed up to the open doors 170b and 170c, such that trailer interiors 142b, 142c are shown ready for load or unloading operations. As can be seen with reference to FIG. 4, the centrifugal blowers 112 are mounted above and off to the side of the overhead doors 170, so only a small portion of the blower discharge 116 occupies the door opening.

In the illustrated embodiment, the heat exchange elements 124 of the heat exchange unit 118 are contained in an air handling unit 172 of a building's heating/ventilation/air conditioning (HVAC) system. As noted above, the air handling unit 172 supplies temperature-conditioned air 120 to the inlet portion of the blower housing via the supply duct 126. The air handling unit 172 may include a secondary blower 174 to move the temperature-conditioned air 120 through the ductwork 126.

The air handling unit 172 may also include components to heat the temperature-conditioned air 120 in cold weather, such as a humidifier 176 coupled to the heat exchange unit 118 to increase the moisture content of the temperature-conditioned air 120, heaters, or hot water coil.

As noted above, a controller 128 can be operatively associated with the centrifugal blower 112 and the heat exchange unit 118. The controller 128 can be configured to monitor a condition related to the centrifugal blower 112 and regulate the supply of temperature-conditioned air 120 in response to the condition. In one embodiment, the controller 128 regulates the supply of temperature-conditioned air 120 by executing instructions to operate the secondary blower 174 in the air handling unit 172. The controller 128 may interface with or may comprise a controller operating a building's automation and control network, such as the BACnet communications protocol.

In another embodiment of the invention, the conditioned air blower system 110 may include a damper system 132 configured to regulate the amount or degree or percentage of temperature-conditioned air 120 supplied to the centrifugal blower 112. The damper system 132 may be positioned within the inlet portion 114 of the centrifugal blower 112, or may be accommodated within the air handling unit 172. The damper system 132 may be activated and positioned by the controller 128. In one example, the controller 128 could monitor a condition such as a temperature sensor placed in the trailer interior 142. Based upon demand, the controller 128 could execute instructions, such as a control loop, to maintain a balance point with the HVAC system. A low amperage servo motor could operate the damper system 132 in response to commands from the controller 128.

In another embodiment of the invention, the conditioned air blower system 110 may be operatively associated with a dock safety sensor system, such as the Smart Chock™ brand sensor system sold by DL Manufacturing, Syracuse, NY Briefly, the dock safety sensor system is a trailer restraint system that secures the trailer while communicating with drivers and loading dock workers to ensure a safe and productive work environment. The dock safety sensor system includes a chock (not shown), an outside-mounted light box 178 (shown in dashed lines because it is located on the other side of the dock wall 130), and an inside-mounted control panel 180 with light box.

In operation, in a first step, as a driver backs up to a closed overhead door 170, the outside light box 178 illuminates green, indicating it is safe to proceed. Concurrently, the control panel 180 illuminates a red light, indicating the trailer is not chocked and it is unsafe to open the overhead door 170. In a second step, when the trailer is parked and chocked, a sensor in the chock relays the condition to the inside control panel 180, which illuminates a chock indicator light on the outside light box 178. Concurrently, the red light turns off and a green light illuminates on the inside control panel 180, indicating the trailer is chocked and it is safe to open the overhead door 170. In a third step, a photovoltaic sensor detects when the door is opened, relays the condition to the inside control panel 180, and a flashing red light is illuminated on the outside light box 178, indicating to the truck driver that loading operations are in progress and it is unsafe to remove the chock. The green light remains illuminated on the inside control panel 180. In a fourth step, when loading or unloading operations are complete and the overhead door 170 is closed, the flashing red light is turned off on the outside light box 178, indicating it is now safe to remove the chock. In a fifth step, after the driver removes the chock, the sensor in the chock relays the condition to the inside control panel 180, which turns off the chock indicator light on the outside light box 178. Concurrently, the green light turns off and the red light illuminates on the inside control panel 180, indicating the trailer is no longer chocked and it may be unsafe to open the overhead door 170.

In one embodiment of the invention, the inside control panel 180 can interlock and control operation of the centrifugal blower 112. For example, at step three above, when the sensor detects the overhead door 170 is open and the condition is relayed to the inside control panel 180, the controller 128 may send instructions to initiate operation of the centrifugal blower 112. The instructions may take the form of a simple on/off command, or in other examples, may initiate a logic sequence stored in the memory of the controller 128 to determine if blower operation is warranted. In another example, the instructions may control operation of the secondary blower 174 in the air handling unit 172, or the damper system 132.

Figure 5:
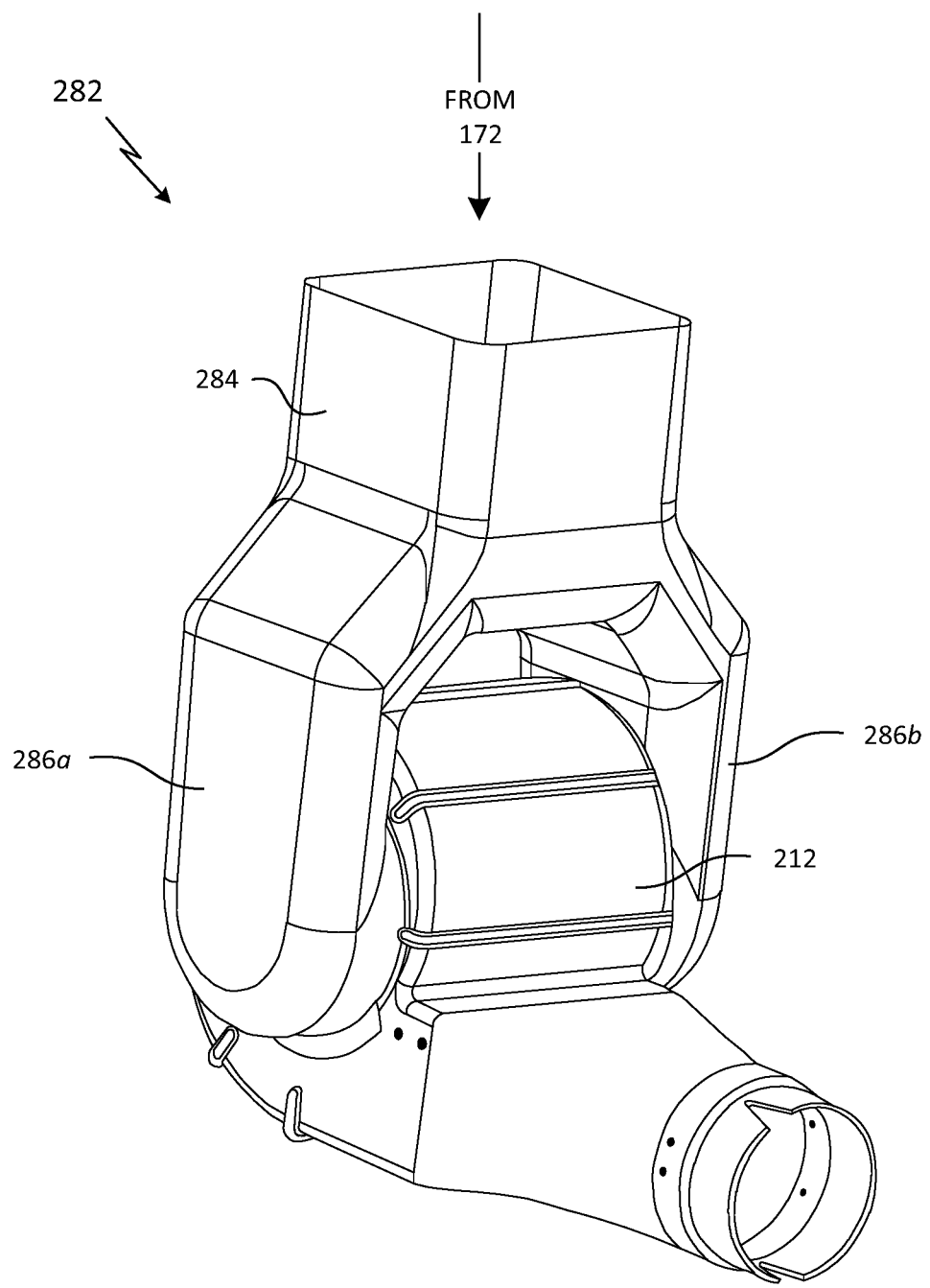
FIG. 5 depicts a perspective view of an adapter cuff in accordance with a third embodiment of the invention.

Turning now to FIG. 5, in another embodiment of the invention, an inlet portion of a conditioned air blower system may include an adapter cuff 282 to better distribute the air flow over the inlet, or to provide a functional inlet flow distribution in limited space. The adapter cuff 282 includes a first end 284 to mate with a supply duct 226 from an air handling unit 272, and a cuff region 286 to modify the inlet flow geometry. In the illustrated embodiment, the cuff region 286 includes symmetric cuff components 286a and 286b. Typical centrifugal blowers have uneven flow distribution over the inlet face, or from one side to the other, and the adapter cuff 282 can be used to redistribute the internal flow to provide more uniform entry into the blower. The adapter cuff 282 can also provide a low-profile entry path into the centrifugal blower 212. In one embodiment, the profile may be approximately one-half the width of the supply duct 226. In other examples, the profile may be between one-third and three-fourths the width of the supply duct 226.

Figure 6:
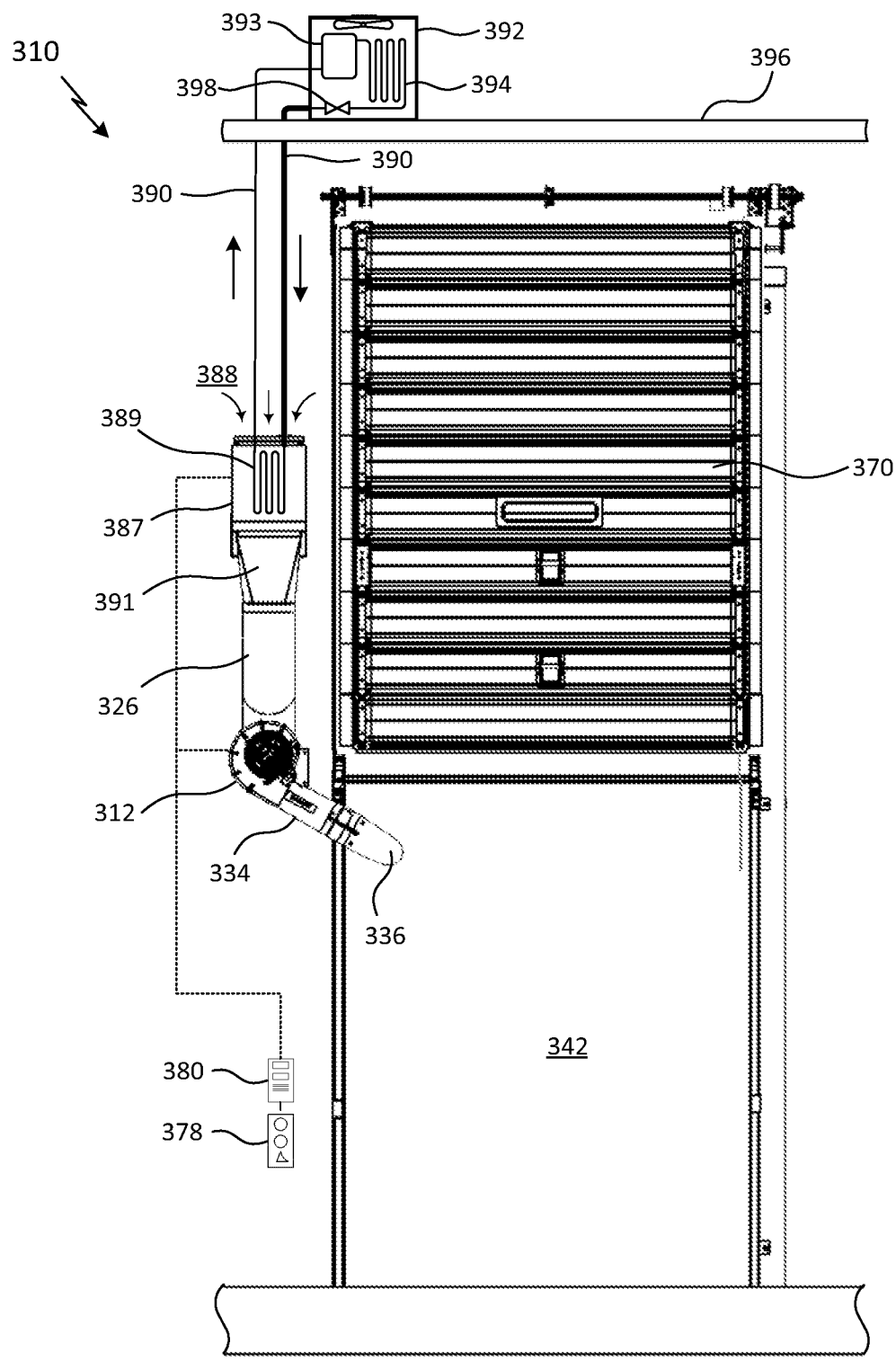
FIG. 6 depicts a plan view of a conditioned air blower system in accordance with a fourth embodiment of the invention.

FIG. 6 depicts a plan view of a conditioned air blower system 310 according to yet another embodiment of the invention. In this embodiment, the components utilized to supply temperature-conditioned air to the centrifugal blower 312 are stand-alone units that do not tie into the building's existing HVAC system. As a result, installation of the conditioned air blower system 310 is less complicated, less labor intensive, and reduces capital cost.

The conditioned air blower system 310 may include many of the components as depicted in FIG. 2, such as the centrifugal blower 312, including the discharge adapter 334 and elbow conduit 336. The conditioned air blower system 310 further includes a heat exchange unit, embodied as an evaporator unit 387, such as that found in a residential split air conditioning unit. The evaporator unit 387 includes an ambient air inlet portion 388, an evaporator coil 389 as part of a closed-loop refrigerant line 390, and a conditioned air exit portion 391, which is connected to the inlet portion of the blower 312 via supply duct 326.

The conditioned air blower system 310 may further include a condenser unit 392, such as that found in a residential split air conditioning unit. The condenser unit 392 may include a refrigerant compressor 393, a refrigerant condenser coil 394 as part of the closed-loop refrigerant line 390, and heat-rejection fins 395 (not illustrated) to remove heat from the circulating refrigerant. The condenser unit 392 may be mounted on a support frame 396 suspended from the ceiling. The support frame 396 may be positioned well above the overhead door 370 to provide adequate clearance for the door's movement.

In operation, cold refrigerant is pumped through the evaporator coil 389 within the evaporator unit 387. The centrifugal blower 312 draws ambient air through the air inlet portion 388, across the evaporator coil 389 where the air is chilled, through the supply duct 326, and into the inlet of the centrifugal blower 312. The chilled air is expelled out the elbow conduit 336 and into the trailer interior 342.

As the ambient air is drawn across the evaporator coil 389, the refrigerant in the coil absorbs heat from the air. As the refrigerant absorbs heat, it evaporates into a low-pressure gas, which enters the compressor 393. The compressor 393 increases the pressure and temperature of the refrigerant gas, which then moves through the condenser coil 394. As the refrigerant passes through the condenser coil 394, heat is removed and the gas condenses back into a liquid. The liquid refrigerant flows to an expansion valve 398, which regulates how much refrigerant is supplied to the evaporator unit 387. The cold refrigerant then flows out the condenser unit 392 back to the evaporator unit 387, and the cooling cycle starts over again.

Turning now to FIGS. 7-11, in another embodiment of the invention the conditioned air blower system 4010 may serve a dual purpose. In a first function, when a trailer is backed up to an open door on the loading dock, the system 4010 can provide conditioned air (heated or cooled) to ventilate the trailer interior during loading or unloading operations. In a second function, when there is no trailer present, the conditioned air blower system 4010 may provide conditioned air (heated or cooled) to the facility. The functions may be managed by way of a diverter apparatus that provides at least two flow paths for the conditioned air exiting the heat exchange unit. The diverter apparatus may be configured to open one flow path and close off the other, depending upon the particular need.

Element numbering in FIGS. 7-11 follows like parts as described in earlier embodiments but is preceded by a 4-series. For example, centrifugal blower 4012 is likened to centrifugal blower 12 shown in FIG. 1.

Figure 7:
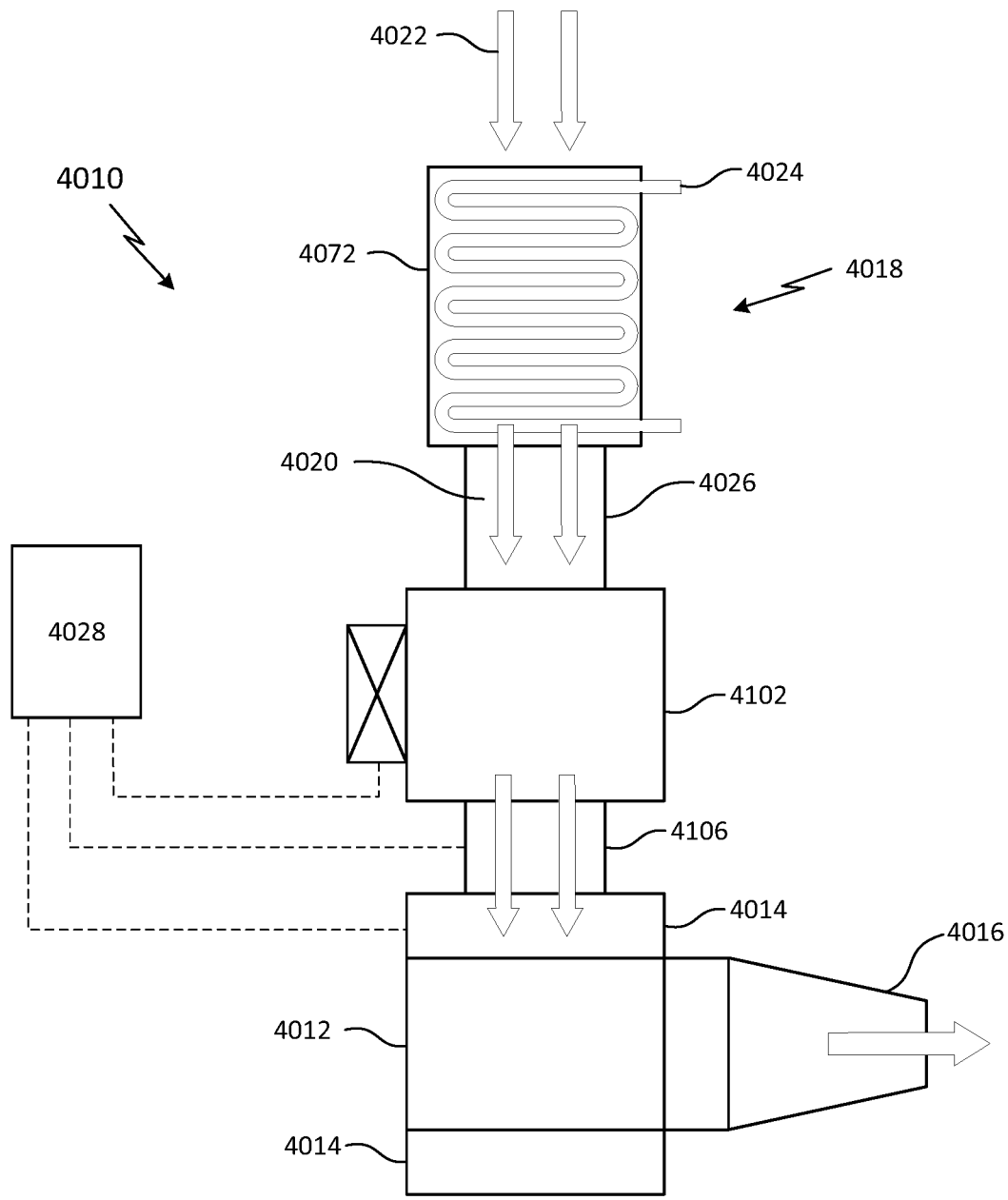
FIG. 7 depicts a block schematic diagram of a conditioned air blower system in accordance with a fifth embodiment of the invention, shown in a first position.
Figure 8:
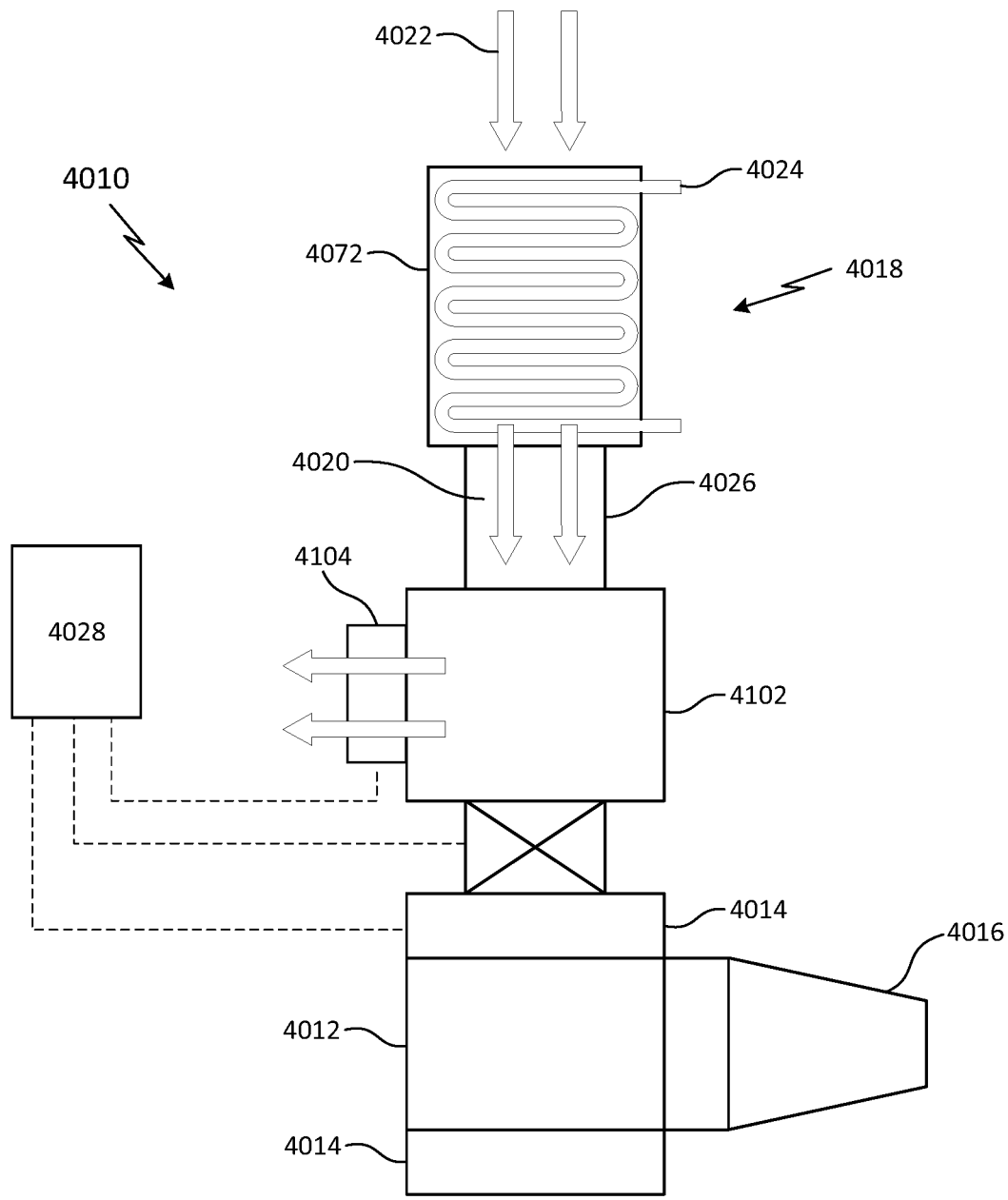
FIG. 8 depicts a block schematic diagram of the conditioned air blower system of FIG. 7, shown in a second position.
Figure 9:
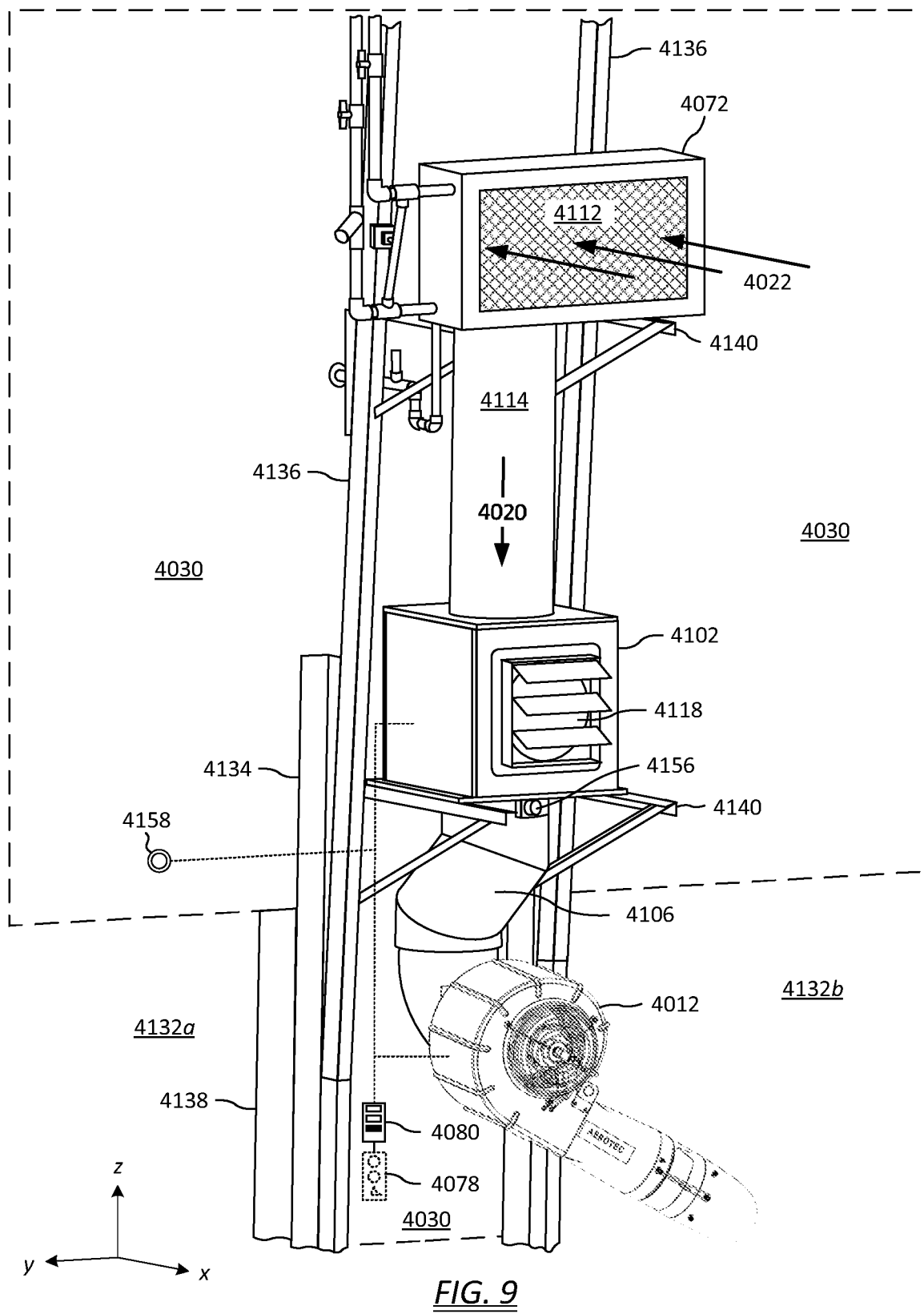
FIG. 9 depicts a perspective view of the conditioned air blower system in accordance with the embodiment shown in FIGS. 7 and 8.
Figure 10:
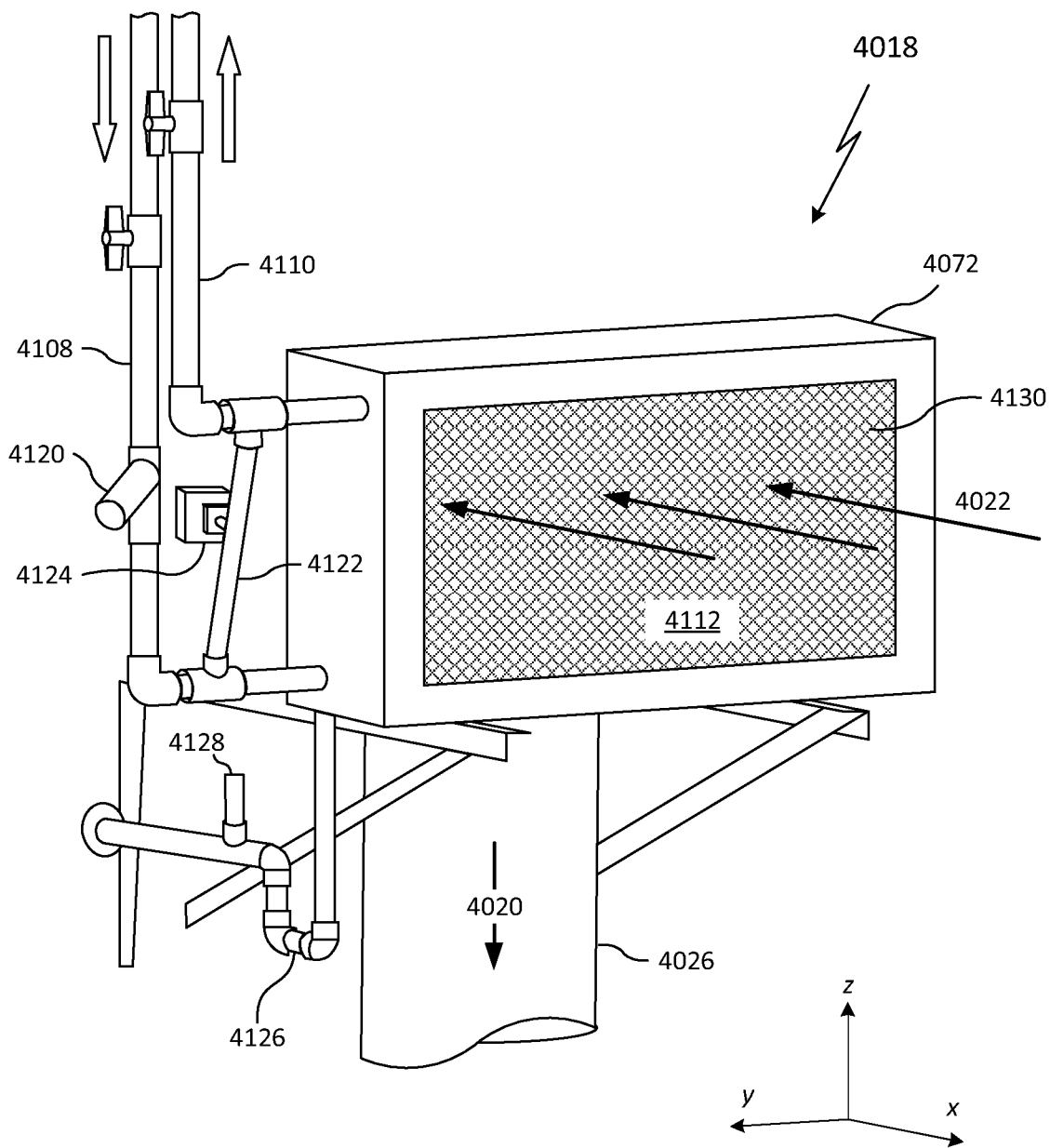
FIG. 10 depicts an enlarged view of the chiller system shown in FIG. 9.
Figure 11:
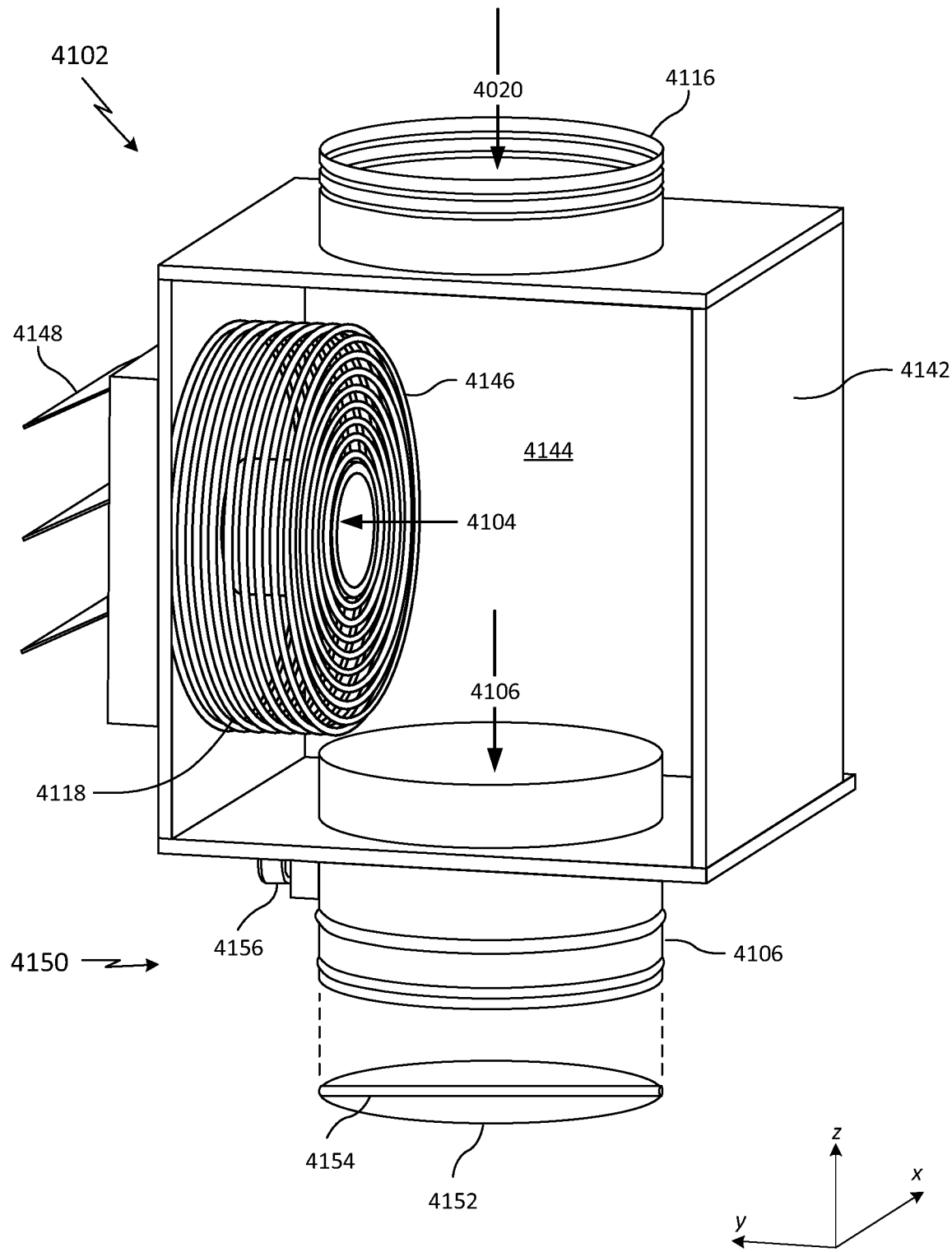
FIG. 11 depicts an enlarged view of the diverter apparatus shown in FIG. 9.

FIGS. 7 and 8 depict schematic block diagrams of one embodiment of a dual-purpose conditioned air blower system 4010, and FIGS. 9-11 depict perspective views of the system 4010 shown in FIGS. 7 and 8. A heat exchange unit 4018 supplies temperature-conditioned air 4020 to a diverter apparatus 4102, which may then direct the air through a first diverter outlet 4104 to the facility (FIG. 7), or through a second diverter outlet 4106 to the centrifugal blower 4012 (FIG. 8). Whichever outlet 4104, 4106 is not in use may be closed off, as shown by an "X" in the block diagrams. The conditioned air blower system 4010 may further include a controller 4028 to monitor one or more input conditions or sensors related to loading dock trailer occupancy and, in response to the input conditions or sensors, activate elements of the system, as will be explained in further detail below.

In the illustrated example, the heat exchange unit 4018 is part of a facility chiller system, similar to that depicted in FIG. 4. Referring especially to FIGS. 9-10, a heat exchange liquid such as chilled water (or propylene glycol/water mix) is provided through supply leg 4108, flows through chiller coils 4024 (FIG. 7) enclosed within coil box 4072, and exits via return leg 4110. Ambient air 4022 from the facility is drawn in through an air inlet portion 4112 of the coil box 4072, brought into heat exchange relationship with the chiller coils 4024, exits a conditioned air outlet 4114 as temperature-conditioned air 4020, and proceeds through supply duct 4026 to a diverter inlet 4116 on the diverter apparatus 4102. The driving force to draw in the ambient air 4022 may depend upon which diverter outlet is currently in use. For example, if the second diverter outlet 4106 is closed, the first diverter outlet 4104 may include a diverter fan 4118 fluidly coupled thereto to provide the motive force for the temperature-conditioned airflow to the facility. Conversely, if the first diverter outlet 4104 is closed, the centrifugal blower 4012 may provide the motive force for the temperature-conditioned airflow to the interior of the trailer.

The coil box 4072 may also include components to heat the temperature-conditioned air 4020 in cold weather, such as a humidifier (not shown) coupled to the heat exchange unit 4018 to increase the moisture content of the temperature-conditioned air, heaters, or hot water coil.

The chiller loop may further include a Y-type sediment strainer 4120 to remove insoluble impurities, and a bypass leg 4122 between the supply leg 4108 and the return leg 4110. The bypass leg 4122 can be used, for example, to control the flowrate through the coil box 4072, including bypassing the coil box completely for maintenance. The bypass flow may be regulated by control valve 4124. The base or floor of the coil box 4072 may include provision for a condensate trap 4126. The trap 4126 may also include a vent 4128, and may be directed through the loading dock wall 4030 to an appropriate outdoor drain. In one example, the coil box 4072 may be designed for a 4-ton cooling capacity.

The heat exchange unit 4018 may further include a filter element 4130 at the ambient air inlet portion 4112 to filter pollutants or contaminants out of the air that passes through. The filter element 4130 may further include a disinfectant device, such as an ultraviolet germicidal irradiation lamp or ozone generator.

In FIG. 9 of the illustrated example, the loading dock wall 4030 is shown within the dashed lines. A tilt-back type overhead door (not shown) closes off openings 4132a and 4132b in the loading dock wall 4030. The overhead door assembly includes a mounting rail 4134 and vertical roller track 4136 mounted on either side of the door frame 4138. Both the coil box 4072 and the diverter apparatus 4102 may be mounted on shelves 4140 secured to the loading dock wall 4030, in between the vertical roller tracks 4136. The coil box 4072 and diverter apparatus 4102 may be positioned as close as practical to the centrifugal blower 4012 to minimize thermal losses. Stated another way, the supply duct 4026 from the heat exchange unit 4018 should be as short as practical.

FIG. 11 illustrates one embodiment of the diverter apparatus 4102 in greater detail. Temperature-conditioned air 4020 flows through the diverter inlet 4116 into a box-like housing 4142 defining an internal plenum 4144. The first diverter outlet 4104 may include a diverter fan 4118 and an optional wire-cage fan guard 4146. The diverter fan 4118 is shown internal to the housing 4142 and in operation (i.e., powered on). The first diverter outlet 4104 may further include a damper mechanism 4148 to close off the outlet if the temperature-conditioned air 4020 is to be directed through the second diverter outlet 4106. In the illustrated example, the damper mechanism is a set of gravity-driven shutters 4148 that are in a normally-closed position. That is, in the absence of airflow from the diverter fan 4118, gravity pulls the shutters 4148 downward to an overlapping closed position and prevents ambient air from being entrained into the plenum 4144. Conversely, when the diverter fan 4118 is operating, the flow of temperature-conditioned air 4020 pushes the shutters 4148 upward to an open position (as illustrated). The shutters 4148 stay open as long as the fan is running. In another possible configuration, the shutters 4148 may be motorized to the open and closed positions to assure a tighter seal.

The second diverter outlet 4106 may also include a second damper mechanism 4150, operating in opposing relationship to the damper mechanism 4148 in the first diverter outlet 4104. In this regard, damper 4150 may operate in the normally-open position so that it remains open when the first damper mechanism is closed and/or, in the case of a motorized damper, remains open when no electrical power is applied. In the illustrated embodiment, damper 4150 is a butterfly damper positioned within the second diverter outlet duct 4106, shown in exploded view (dashed lines) for clarity. The butterfly damper 4150 may include a single, round blade 4152 that pivots about a central hinge 4154 and seals around the circumference of the duct 4106. The hinge may be operated by an actuator 4156, such as a motor, spring, or manual knob.

Other diverter mechanisms are contemplated within the scope of the present invention, and the disclosed embodiments are not intended to be limiting. For example, the housing 4142 may be replaced with a 3-way valve or like device. Furthermore, the first damper 4148, depicted as gravity-driven shutters, may be configured as a normally-closed butterfly damper. Similarly, the second damper mechanism 4150, depicted as a normally-open butterfly damper, may be configured as normally-open shutters.

In another construction of the conditioned air blower system 4010, the diverter fan 4118 may be located farther upstream, similar to the secondary blower 174 depicted in the air handling unit 172 shown in FIG. 4. For example, the fan or blower 4118 may be located in the supply duct 4026 or even in the coil box 4072.

Referring to FIGS. 7 and 8, the conditioned air blower system 4010 may further include a controller 4028 operatively associated with the centrifugal blower 4012, the heat exchange unit 4018, and/or the first and second diverter outlets 4104, 4106 respectively. The controller 4028 can be configured to monitor an input condition or sensor related to loading dock trailer occupancy and, in response to the input condition, activate elements of the system 4010 such as the blower 4012, diverter fan 4118, or second damper mechanism 4150. In one example, one or more sensors 4158 (FIG. 9) may detect the presence of a trailer at the loading bay. The sensor 4158 may be a photo eye configured to detect an overhead door in the open position, such as that shown at 170b, 170c (FIG. 4). Or, the one or more sensors 4158 may comprise a two-part magnetic sensor system to detect an overhead door in the closed position, as shown at 170a, 170d. There, proper alignment of a door-mounted magnet 4158b with a rail-mounted sensor 4158a can generate an electrical signal or impulse, which is transmitted to the controller 4028, and the controller can issue commands to operate certain equipment of the conditioned air blower system 4010.

In another embodiment of the invention, the conditioned air blower system 4010 may be operatively associated with a dock safety sensor system, such as the aforementioned Smart Chock™ brand sensor system sold by DL Manufacturing, Syracuse, NY As seen in FIG. 9, the safety system includes an outside-mounted light box 4078 (shown in dashed lines because it is located on the other side of the loading dock wall 4030), and an inside-mounted control panel 4080 with light box. The inside control panel 4080 may include the controller 4028.

In one example, if the sensor 4158 detects the overhead door is open and other sensors detect a trailer is properly chocked, the controller 4028 may issue commands close the first diverter outlet 4104, open the second diverter outlet 4106, and energize the blower 4012. The command to open the second diverter outlet 4106 may include operating the actuator 4156 to open the second damper mechanism 4150.

Conversely, if the sensor 4158 detects the overhead door is closed, the controller 4028 may issue commands to open the first diverter outlet 4104 and close the second diverter outlet 4106. The step of opening the first diverter outlet 4104 may include energizing the diverter fan 4118 and shutters 4148 (if motorized). In this manner, the conditioned air blower system 4010 can supply cool (or warm) air to the facility when the overhead doors are closed.

Figure 12:
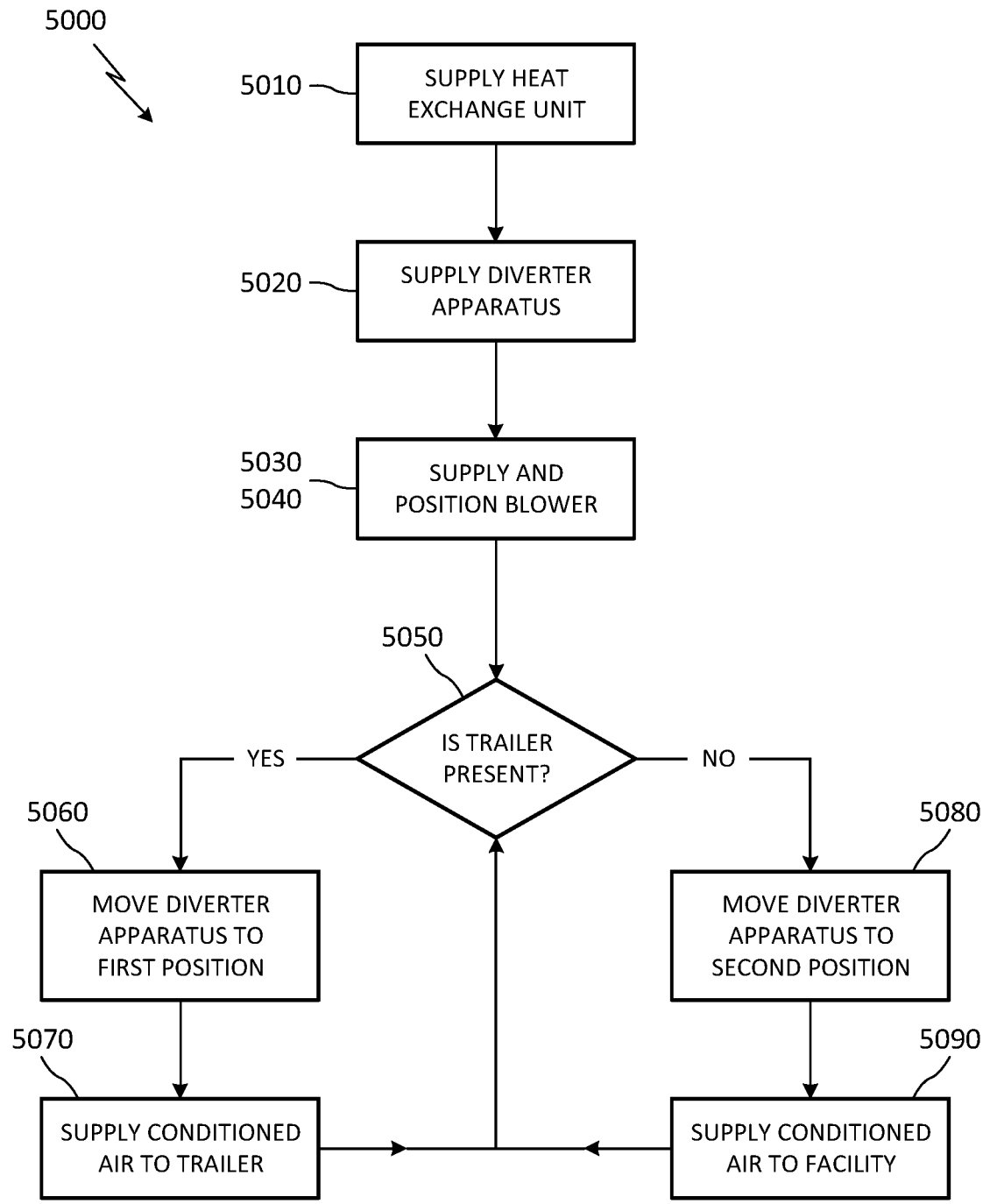
FIG. 12 depicts a flow chart illustrating an exemplary embodiment of a method for providing conditioned air at a loading dock.

FIG. 12 depicts a method 5000 for providing conditioned air at a loading dock. At a step 5010, a heat exchange unit is provided. The heat exchange unit receives ambient air from the facility and discharges temperature-conditioned air, meaning air that has been heated or cooled relative to the temperature of the ambient air in the loading dock area, including air that has had its moisture content adjusted relative to that surrounding the loading dock area.

The heat exchange unit may include direct or indirect heat exchange elements to condition a supply of ambient air. Furthermore, the heat exchange unit may transfer thermal energy by conduction (physical touching), convection (moving fluids transport thermal energy away from source), or radiation (surface emits electromagnetic waves or thermal radiation). An exemplary direct heat exchange element may include, but is not limited to, a duct electrical heater, in which open coil resistive elements generate heat and the air to be conditioned is passed over the resistive elements; thermal energy is transferred by convection. Exemplary indirect heat exchange elements may include, but are not limited to, radiators, serpentine tubes, finned tube coils, ducted or channeled plates, and microchannel heat exchangers.

In a serpentine tube heat exchange element, such as that shown in FIG. 8, a fluid is circulated through the inside of the tube, and the air to be conditioned is passed over the serpentine structure. In the cooling scenario, the inner fluid is a cold liquid such as water, glycol/water mixture, or refrigerant. Because heat flows from hot to cold, the thermal energy in the ambient air is transferred by convection through the tube wall to the inner fluid and carried away. Microchannel heat exchange elements operate by the same principal, but are far more efficient.

Finned tube coils operate in a similar manner, except the fluid in the tubes is usually hotter than the air to be conditioned, so the air is warmed. In a warming scenario, the inner fluid is a hot liquid or gas such as water, glycol/water mixture, or steam. The thermal energy in the inner fluid is transferred by convection through the tube wall to the fins, which help dissipate the heat by increasing the surface area of the tube. The heat is carried away by convection to the flowing conditioned air stream.

Ducted or channeled plate heat exchange elements exchange thermal energy typically between the intake and exhaust air streams of an air handling unit without moisture being transferred or the air streams being mixed. The plate heat exchange elements use thin plates of metal to separate the two fluids. The plates can have corrugations to form ductways when stacked. The plates are thin and thermally conductive, and provide a very large surface area to improve heat transfer. Additionally, the two fluids typically flow in opposite directions. The thermal energy of the hottest fluid is transferred onto the plate wall by convection, and then conducted through to the other side. The other fluid, which is entering at a lower temperature, then carries the thermal energy away through convection.

The method 5000 for providing conditioned air at a loading dock further includes a step 5020 of providing a diverter apparatus. The diverter apparatus may include a diverter inlet, a first diverter outlet, and a second diverter outlet. The diverter apparatus may be configured to receive the temperature conditioned air at the diverter inlet from the heat exchange unit, the first diverter outlet may be configured to discharge the temperature conditioned air to the facility, and the second diverter outlet may be configured to discharge the temperature conditioned air to a trailer at the loading dock.

The method 5000 for providing conditioned air at a loading dock further includes a step 5030 of supplying a blower and a step 5040 of positioning the blower into the trailer opening. The diverter apparatus may be positioned as close as practical to the centrifugal blower to minimize thermal losses.

The method 5000 further includes a step 5050 to determine if a trailer is present at the loading dock. One or more sensors may detect the presence of a trailer at the loading bay, for example a photo eye configured to detect an overhead door in the open position, or a two-part magnetic sensor system to detect an overhead door in the closed position. The sensors may be operatively associated with a controller that controls the operation of the conditioned air blower system 4010. The controller may also be operatively associated with a dock safety sensor system. Sensor outputs from the dock safety sensor system may be utilized to determine if a trailer is present at the loading dock.

If a trailer is present, the method 5000 includes a step 5060 to move the diverter apparatus to a first position and a step 5070 to supply conditioned air to the trailer. In the first position, the diverter outlet to the facility is closed and the facility-side diverter fan is de-energized, while the trailer-side diverter outlet is opened and the blower is energized.

If a trailer is not detected, the method 5000 includes a step 5080 to move the diverter apparatus to a second position and a step 5090 to supply conditioned air to the facility. In the second position, the diverter outlet to the facility is opened and the facility-side diverter fan is energized, while the trailer-side diverter outlet is closed and the blower is de-energized.

One advantage to the dual-purpose conditioned air blower system 4010 disclosed in FIGS. 7-11 is that the chiller system may remain in continuous operation (i.e., full flow), which is more efficient for the chiller and easier to maintain control. At the same time, the available thermal capacity in the circulating chiller loop is not wasted.

As used herein, an element or function recited in the singular and proceeded with the word "a" or "an" should be understood as not excluding plural said elements or functions, unless such exclusion is explicitly recited. Furthermore, references to "one embodiment" should not be interpreted as excluding the existence of additional embodiments that also incorporate the recited features.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. For example, the description of a secondary fan with respect to the dual-purpose conditioned air blower system does not imply that embodiments could not be practiced with a single fan or blower. Also, while a number of particular embodiments have been described, it will be understood that features and aspects that have been described with reference to each particular embodiment can be used with each remaining particularly described embodiment.

What is claimed is:

1. A facility-based dual-purpose conditioned air blower system, comprising:
    a heat exchange unit comprising an ambient air inlet, heat exchange elements, and a conditioned air outlet;
    a diverter apparatus, comprising:
        a diverter inlet fluidly coupled to the conditioned air outlet of the heat exchange unit;
        a first diverter outlet to the facility; and
        a second diverter outlet;
        the diverter apparatus moveable between a first position wherein the first diverter outlet is closed and the second diverter outlet is open, and a second position wherein the first diverter outlet is open and the second diverter outlet is closed;
    and;
    a centrifugal blower comprising a blower inlet fluidly coupled to the second diverter outlet of the diverter apparatus, and a blower outlet positioned to ventilate a trailer interior with conditioned air from the conditioned air outlet of the heat exchange unit.

2. The dual-purpose conditioned air blower system according to claim 1, wherein the heat exchange unit comprises a chiller system.

3. The dual-purpose conditioned air blower system according to claim 2, wherein the chiller system comprises chiller coils positioned within a coil box, a facility supply leg coupled to a first end of the chiller coils, a facility return leg coupled to an opposing second end of the chiller coils, and wherein the coil box is configured to pass the air drawn through the ambient air inlet across the chiller coils in heat exchange relationship.

4. The dual-purpose conditioned air blower system according to claim 3, further comprising a bypass leg and control valve between the facility supply leg and the facility return leg.

5. The dual-purpose conditioned air blower system according to claim 1, wherein the first diverter outlet includes a first damper with shutters.

6. The dual-purpose conditioned air blower system according to claim 5, wherein the shutters are of the gravity-driven type.

7. The dual-purpose conditioned air blower system according to claim 1, wherein the first diverter outlet is configured in a normally-closed position.

8. The dual-purpose conditioned air blower system according to claim 1, further including a diverter fan fluidly coupled to the first diverter outlet.

9. The dual-purpose conditioned air blower system according to claim 8, wherein the diverter fan is close-coupled to the first diverter outlet.

10. The dual-purpose conditioned air blower system according to claim 1, wherein the second diverter outlet is configured in a normally-open position.

11. The dual-purpose conditioned air blower system according to claim 1, wherein the second diverter outlet includes a second damper.

12. The dual-purpose conditioned air blower system according to claim 11, wherein the second damper comprises a butterfly damper operated by an actuator.

13. The dual-purpose conditioned air blower system according to claim 1, further comprising a controller operatively associated with the diverter apparatus and the centrifugal blower, the controller programmed to, responsive to the presence of the trailer, energize the centrifugal blower and command the diverter apparatus to the first position.

14. The dual-purpose conditioned air blower system according to claim 13, wherein the presence of a trailer is determined by a sensor detecting a loading dock door in an open position.

15. The dual-purpose conditioned air blower system according to claim 13, wherein the controller is programmed to, responsive to the absence of a trailer, de-energize the centrifugal blower and command the diverter apparatus to the second position.

16. The dual-purpose conditioned air blower system according to claim 15, wherein the absence of a trailer is determined by a sensor detecting a loading dock door in a closed position.

17. A method for providing conditioned air at a loading dock, the method comprising the steps of:
  supplying a heat exchange unit comprising an ambient air inlet, heat exchange elements, and a conditioned air outlet;
  supplying a diverter apparatus, the diverter apparatus comprising a diverter inlet fluidly coupled to the conditioned air outlet of the heat exchange unit, a first diverter outlet, and a second diverter outlet;
  supplying a centrifugal blower comprising a blower inlet fluidly coupled to the second diverter outlet of the diverter apparatus;
  positioning the centrifugal blower to ventilate a trailer interior with conditioned air from the conditioned air outlet of the heat exchange unit;
  determining the presence of a trailer at the loading dock; and
  if a trailer is present, moving the diverter apparatus to a first position wherein the first diverter outlet is closed and the second diverter outlet is open; and
  if a trailer is not present, moving the diverter apparatus to a second position wherein the first diverter outlet is open and the second diverter outlet is closed.

18. The method for providing conditioned air at a loading dock according to claim 17, further comprising the steps of providing a controller operatively associated with the centrifugal blower and at least one of the first and second diverter outlets, and activating the diverter apparatus to the first position or second position.

19. The method for providing conditioned air at a loading dock according to claim 18, wherein the controller enables operation of the centrifugal blower in response to an indication that an overhead door is open at the trailer interior.

20. The method for providing conditioned air at a loading dock according to claim 18, wherein the controller is further operatively associated with a dock safety sensor system.

* * * * *